350-96.17 SR
5/8/79          OR      4,153,330

United States Patent [19]

Tomlinson, III

[11] 4,153,330

[45] May 8, 1979

[54] SINGLE-MODE WAVELENGTH DIVISION OPTICAL MULTIPLEXER

[75] Inventor: Walter J. Tomlinson, III, Holmdel, N.J.

[73] Assignee: Bell Telephone Laboratories, Incorporated, Murray Hill, N.J.

[21] Appl. No.: 856,280

[22] Filed: Dec. 1, 1977

[51] Int. Cl.² ............................................. G02B 5/14
[52] U.S. Cl. ............................. 350/96.17; 350/96.18; 350/96.19
[58] Field of Search ............... 350/96.12, 96.13, 96.15, 350/96.16, 96.17, 96.18, 96.19

[56] References Cited

U.S. PATENT DOCUMENTS

| 3,614,198 | 10/1971 | Martin et al. | 350/96.18 |
| 3,814,498 | 6/1974 | Tomlinson et al. | 350/96.19 |
| 3,908,121 | 9/1975 | Riseberg et al. | 350/96.13 X |
| 3,917,384 | 11/1975 | Harper et al. | 350/96.18 |
| 4,067,642 | 1/1978 | King et al. | 350/96.19 |

OTHER PUBLICATIONS

Livanos et al, "Chirped-grating Demultiplexers in Dielectric Waveguides", Appl. Phys. Lttr., vol. 30, No. 10, May 1977, pp. 519–521.
Stigliani et al, "Wavelength Division Multiplexing...", NTIS Report AD-721 085, Mar., 1971.

*Primary Examiner*—John K. Corbin
*Assistant Examiner*—John D. Lee
*Attorney, Agent, or Firm*—Daniel D. Dubosky

[57] ABSTRACT

A wavelength division optical multiplexer for combining single mode beams involves a lens formed in a thin-film waveguide and a reflection diffraction grating outside the waveguide.

10 Claims, 5 Drawing Figures

SINGLE-MODE WAVELENGTH DIVISION OPTICAL MULTIPLEXER

BACKGROUND OF THE INVENTION

The idea of wavelength division multiplexing has been extensively developed at lower frequencies, but not at optical frequencies, and an optical wavelength division multiplexer for single-mode signals has been discussed only with respect to a device that does not provide output beams that can easily be coupled to optical fibers or to small detectors. See "Chirped-Grating Demultiplexer in Dielectric Waveguides", by A. C. Livanos et al, *Applied Physics Letters*, 30, 519 (1977).

The closest prior art considered and rejected the use of diffraction gratings. "Wavelength Division Multiplexing in Light Interface Technology" by R. J. Stigliani et al in Report AD-721 085, available from the National Technical Information Service, addresses the problem of designing a multimode optical multiplexer. They conclude that diffraction gratings are impractical, thus teaching away from the present invention. That report did not contemplate the use of single-mode signals.

In my copending application, Ser. No. 787,329, filed Apr. 14, 1977, now U.S. Pat. No. 4,111,524, Sept. 5, 1978, for a multimode multiplexer, a cylindrical focusing device is used to collimate and focus the multimode signals.

SUMMARY OF THE INVENTION

The invention relates to a wavelength division multiplexer/demultiplexer for processing single-mode optical beams carried on single-mode optical fibers. An illustrative embodiment includes a thin-film waveguide containing a focusing element for collimating input radiation presented at one edge of the thin-film waveguide and for focusing radiation presented at a second edge of the thin-film waveguide. A reflection diffraction grating is advantageously located outside the thin-film waveguide adjacent to the second edge to reflect radiation at angles dependent on the wavelength. As a result of using an external grating, a highly efficient, broad band multiplexer/demultiplexer is obtained.

DETAILED DESCRIPTION

The description hereinafter refers to a demultiplexer but the action of the device is reciprocal and therefore the device described can be used equally as well as a multiplexer.

Figure 1:
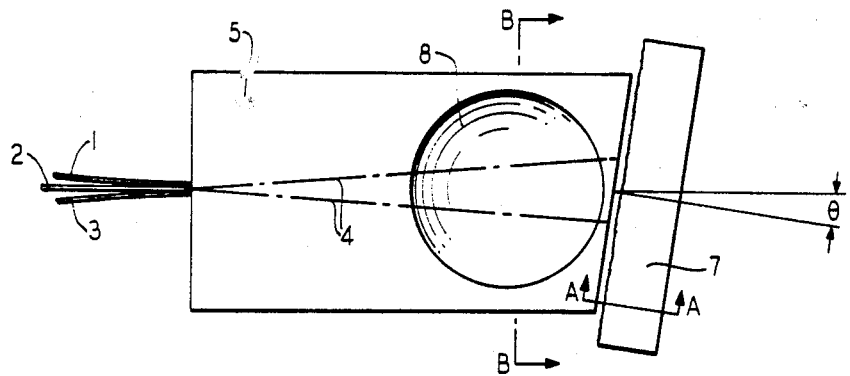
FIG. 1 shows a top view of a multiplexer/demultiplexer constructed according to the invention.
Figure 3:
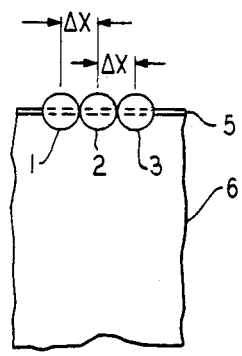
FIG. 3 shows an enlarged side view of the device of FIG. 1 at the fiber connection.
Figure 4:
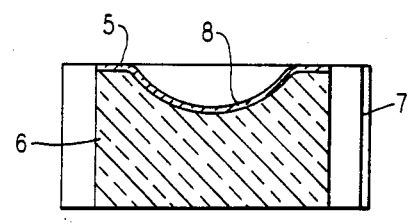
FIG. 4 shows a section through the central unit of the device shown in FIG. 1, along line B—B.

In the demultiplexer shown in FIG. 1, output fibers 1 and 2 and input fiber 3, aligned parallel with each other and with their edges touching, are joined to thin-film waveguide 5 by butt joints secured by a transparent glue. Illustratively, the outer diameter of fibers 1-3 is 110 microns, the thickness of waveguide 5 is 3 microns and waveguide 5 is formed by diffusing Titanium into a Lithium Niobate ($LiNbO_3$) substrate 6 (shown in FIG. 3).

Although the outer diameter of fibers 1-3 is 110 microns, the core is only a few microns in diameter. The fibers are oriented on the $LiNbO_3$ substrate as shown in the enlarged view in FIG. 3, so that their cores are centered on waveguide 5.

Light from input fiber 3 includes signals at two or more different wavelengths, and passes through waveguide 5, diverging as it travels with a typical half angle of approximately 4 degrees, as illustrated by lines 4 of FIG. 1 which indicate the general area covered by both the incoming and outgoing radiation.

The radiation passes through lens 8, illustratively a single-mode geodesic lens. (See "Geodesic Lenses in Single-Mode $LiNbO_3$ Waveguides" by B. Chen, et al in *Applied Physics Letters*, 31, 263 (1977)) for details of lens fabrication. Alternatively, a mode-index lens may be used. (See "Comparison of Optical-Waveguide Technologies", by D. B. Anderson, *IEEE Journal of Quantum Electronics*, QE-13, 275, (1977).) Lens 8 collimates the incoming radiation to form a parallel beam. The collimated radiation beam emerges from waveguide 5 and is reflected from diffraction grating 7, oriented at an angle $\theta$ with respect to the fibers. Each different wavelength component is reflected at an angle that depends on its frequency, and the parameters of the grating are chosen so that lens 8 focuses radiation at different frequencies into the appropriate output fibers.

Since the distance between the fibers and lens 8 is fixed at the lens focal length (so that the input radiation is collimated) and since the distance between lens 8 and grating 7 should be short for increased efficiency, the remaining relevant parameters are the angle of the plane of the grating with respect to the direction of propagation of the input radiation ($\theta$ in FIG. 1), the spacing of the grooves on the grating, and the spacing of the fibers. When it is desired to place the fibers in contact, to form a better mechanical bond, the remaining two parameters may be determined by the solution of standard equations, well known to those skilled in the art.

Figure 2:
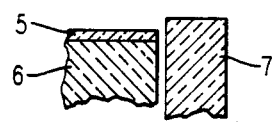
FIG. 2 shows a section along line A—A of FIG. 1.

In FIGS. 1 and 2, a small gap is shown between diffraction grating 7 and the central unit of the multiplexer that contains substrate 6, waveguide 5 and lens 8. The radiation propagates freely in this gap, which is illustratively only a few wavelengths wide. This gap is illustratively filled with a transparent glue that serves to attach grating 7 to substrate 6.

There are a number of transparent glues that could be used to fasten the fibers or the grating to the waveguide. A particularly convenient type to use is one that is cured by the action of light, such as LOCTITE No. 353-18, made by the Loctite Corporation, Newington, Connecticut. This glue has a low viscosty, thus permitting easy alignment of the components to be glued, but can then be cured in about 5–10 minutes once the alignment is complete. As described by Pavlopoulos et al [*Applied Optics*, 16, 1466 (June 1977)], a very small amount of the glue should be used first to fix the parts in the proper alignment, and then a larger quantity of glue added to increase the mechanical strength of the joint.

It is important that the ends of the guide, where the fibers and the grating are attached, be optically flat, without any rounding or chipping. The simplest way to obtain such an edge is by cleaving along a crystal cleavage plane. However, since the two ends must be cut with a specified angle ($\theta$ in FIG. 1) between them, if one end is aligned with a cleavage plane the other end is almost certain to not lie along a cleavage plane. Therefore, at least one end must be cut and polished. To eliminate rounding or chipping of the edge during this process one could glue another piece of the substrate material on top of the waveguide. (This could actually be another multiplexer so that both multiplexers would be polished at the same time.) A thermally softened glue, such as No. 70C Quartz Cement, available from the Hugh Courtright Co., 7652 South Vincennes Avenue, Chicago, Illinois, could be used by heating the substrate to about 110 degrees Centigrade to melt the glue, placing the second substrate on top, applying force to squeeze out the excess glue, and then cooling the assembly. The edge could then be cut at the correct angle with a saw and polished flat using standard crystal polishing techniques. When the polishing was complete the substrates could be separated by heating them to about 110 degrees Centigrade to remelt the glue. The glue remaining on the substrates could then be removed by washing them with alcohol.

The use of a diffraction grating outside the waveguide is a key part of the invention. One skilled in the art would be inclined to put the grating in the waveguide by the usual techniques of integrated circuit manufacture in order to take advantage of the well-known benefits of integrated production, better alignment, and smaller size that follow from an integrated method. Further, one skilled in the art would be aware that a gap between the waveguide and the grating, in which the radiation is propagating freely, presents a risk that the single-mode character will be spoiled. "Chirped-Grating Demultiplexers in Dielectric Waveguides", by A. C. Livanos et al, *Applied Physics Letters,* 30, 519 (1977) is an example of the prior art approach to the design of demultiplexers.

The unexpected result of closer analysis is that a grating in or on the surface of the thin film is impractical, however, because a grating thick enough to reflect back radiation efficiently would function over a relatively narrow frequency range. If a reasonable number of wavelengths are fitted within such a narrow frequency range, there results an unacceptable amount of cross-talk between channels.

In the present embodiment the grating is fitted closely to the thin film, so that the gap between them is only a few wavelengths. As a result, the single-mode character of the beams are not spoiled and the quality of the output signals will be acceptable.

For a multiplexer, the process described above is reversed: radiation enters on two or more optical fibers at two or more carrier beam frequencies, is collimated, is reflected at frequency dependent angles and is focused into the output fiber.

Diffraction grating 7 is illustratively a blazed-plane grating, that is, one in which the grooves are shaped so as to maximize the efficiency of the device for use at particular angles.

In the embodiment illustrated in the Figures, two input signals are demultiplexed. The two input signals are separated in wavelength by $\Delta\lambda = 0.025$ μm, and are equally spaced about a central wavelength $\lambda = 0.82$ μm. The diameter (and the spacing $\Delta x$) of the fibers is 0.11 mm, the focal length (f) of lens 8 is 11 mm, the effective index of waveguide 5 is 2 and the index of the glue is 1.6.

In the present embodiment, the angle $\theta$ between a line parallel to the fibers and a line perpendicular to the grating is calculated from the properties of the lens and the standard grating equation.

The grating equation may be written $$\lambda = \Lambda(\sin\theta + \sin i) \quad (1)$$

where $\lambda$ is the wavelength being diffracted, $\theta$ is the angle between the outgoing beam and a perpendicular to the grating, i is the angle between the incident beam and the same perpendicular and $\Lambda$ is the inter-groove spacing of the grating. When $\theta$ is approximately equal to i, Equation (1) may be rewritten:

$$\lambda = 2\Lambda \sin\theta. \quad (1a)$$

Differentiating Equation (1), and using Equation (1a), $$d\lambda/d\theta = \lambda/(2\tan\theta). \quad (2)$$

A property of the lens that relates to focal length f, the angle $\theta$ and the position (x) of a beam is:

$$dx/d\theta = f. \quad (3)$$

Substituting in Equation (2), we have $$d\lambda/dx = \lambda/(2f\tan\theta). \quad (4)$$

This may be solved for $\theta$:

$$\tan\theta = (\lambda_o/\Delta\lambda)(\Delta x/2f), \quad (5)$$

where $\lambda_o$ is the central wavelength, $\Delta\lambda$ is the interchannel wavelength difference, $\Delta x$ is the spacing between fibers and f is the focal length of the lens. In the example given above, $\theta$ is 8.5 degrees and Equation (1a) gives: $1/\Lambda = 720$ grooves/mm.

In order to reflect back light most efficiently, a blazed plane diffraction grating is used. Taking account of the refraction at the interface between the waveguide and the glue, the blaze angle of grating 7 is given by:

$$\sin\theta_{Blaze} = (n_{glue}/n_{effective})\sin\theta, \quad (6)$$

giving $\theta_{Blaze} = 6.8$ degrees.

Figure 5:
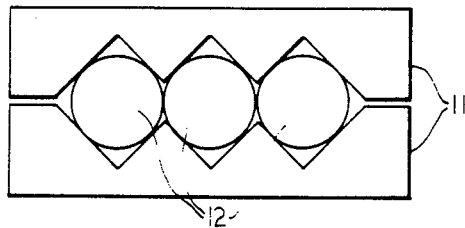
FIG. 5 shows an alignment jig for holding a group of fibers for making precise butt joints.

In the process of forming the butt joints between the optical fibers and the thin film, all of which are only a few microns thick, a delicate alignment procedure must be performed. It may be done by using a pair of symmetric clamps 11, as shown in FIG. 5, to hold fibers 12 at the correct spacing. The array may then be positioned for gluing by either a piezo-electrically driven x-y-x stage (see "Parallel End-Butt Coupling of a GaAs Laser Diode and a Thin-Film Waveguide", R. Hansperger et al presented at the topical meeting on Integrated Optics, Jan. 12-14, 1976, Salt Lake City, Utah, published in the *Digest of Technical Papers,* by the Optical Society of America) or by an eccentric rotating device (see "Coupling Device Connecting a Glass Fiber with an Integrated Optical Circuit", by O. Krumpholz et al, presented at the topical meeting on Integrated Optics, Jan. 21-24, 1974, New Orleans, Louisiana, published in the *Digest of Technical Papers* by the Optical Society of America).

In general the two polarization components of a guided mode have slightly different effective refractive indices, and thus the multiplexer characteristics will depend on the polarization of the input light. To avoid such problems it is preferable that the input signal(s) be all of the same polarization. This can be accomplished by using birefringent fibers that maintain a fixed polarization orientation, and orienting them so as to excite only one polarization component of the guided mode of the planar waveguide. Alternately, with a birefringent substrate, it is possible to make a single-mode waveguide that will only guide one polarization component. (The Chen et al reference noted above reports such a guide, in LiNbO$_3$, that could only support one TE mode.) The disadvantage of the latter approach is that any optical energy from the input(s) that has the "wrong" polarization will be lost, thus contributing to the insertion loss of the device.

The use of the waveguide is not limited to optical fibers, and small photodetectors or sources may be affixed to the waveguide in place of the optical fibers. For example, in a demultiplexer, it may be desirable to use an array of photodetectors glued to the edge of waveguide 5 to detect the separated radiation. Similarly, in multiplexers, semiconductor lasers could be used for the input beams.

What is claimed is:

1. A single-mode optical multiplexer comprising:
   a thin-film optical waveguide mounted on a substrate and having a first edge and a second edge,
   a single-mode output optical fiber coupled to said first edge,
   at least two means for coupling optical radiation into said first edge,
   means, located between said first edge and said second edge, for collimating input light emerging from said at least two means for coupling optical radiation into said first edge, and for focusing collimated light entering from said second edge into said output optical fiber, and
   a reflection diffraction grating adjacent to said second edge for reflecting input light back through said collimating and focusing means into said output fiber.

2. A single-mode optical demultiplexer comprising:
   a thin-film optical waveguide having a first edge and a second edge,
   a single-mode input optical fiber coupled to said first edge,
   at least two means coupled to said first edge, for detecting optical radiation,
   means, located between said first edge and said second edge, for collimating input light emerging from said input fiber and for focusing collimated input light entering from said second edge into said at least two means for detecting optical radiation, and
   a reflection diffraction grating adjacent to said second edge for reflecting and diffracting input light back through said collimating and focusing means into said output fibers.

3. A single-mode optical multiplexer comprising:
   a thin-film optical waveguide mounted on a substrate and having a first edge and a second edge,
   a single-mode output optical fiber coupled to said first edge,
   at least two single-mode input optical fibers coupled to said first edge,
   means, located between said first edge and said second edge, for collimating input light emerging from said at least two input fibers and for focusing collimated light entering from said second edge into said output optical fiber, and
   a reflection diffraction grating adjacent to said second edge for reflecting input light back through said collimating and focusing means into said output fiber.

4. An optical multiplexer according to claim 3 in which said input and output optical fibers are connected to said thin-film waveguide by butt joints.

5. An optical multiplexer according to claim 3 in which said means for collimating input light includes a geodesic lens formed in said substrate.

6. An optical multiplexer according to claim 3 in which said means for collimating input light includes a mode index lens.

7. A single-mode optical demultiplexer comprising:
   a thin-film optical waveguide having a first edge and a second edge,
   a single-mode input optical fiber coupled to said first edge,
   at least two single-mode output optical fibers coupled to said first edge,
   means, located between said first edge and said second edge, for collimating input light emerging from said input fiber and for focusing collimated input light entering from said second edge into said output optical fibers, and
   a reflection diffraction grating adjacent to said second edge for reflecting and diffracting input light back through said collimating and focusing means into said output fibers.

8. An optical demultiplexer according to claim 7 in which said input and output optical fibers are connected to said thin-film waveguide by butt joints.

9. An optical demultiplexer according to claim 7 in which said means for collimating input light includes a geodesic lens formed in said substrate.

10. An optical demultiplexer according to claim 7 in which said means for collimating input light includes a mode index lens.

* * * * *